United States Patent
Goyal et al.

(10) Patent No.: US 7,454,764 B2
(45) Date of Patent: Nov. 18, 2008

(54) METHOD AND SYSTEM FOR ON-DEMAND PROGRAMMING MODEL TRANSFORMATION

(75) Inventors: Maneesh Goyal, Kanata (CA); Daniel D. Leroux, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 11/170,384

(22) Filed: Jun. 29, 2005

(65) Prior Publication Data

US 2007/0006182 A1    Jan. 4, 2007

(51) Int. Cl.
*G06F 13/00* (2006.01)

(52) U.S. Cl. .................. 719/330; 719/316; 719/331; 719/332; 717/136

(58) Field of Classification Search .................. 719/316, 719/330, 331, 332; 717/136
See application file for complete search history.

(56) References Cited

U.S. PATENT DOCUMENTS

| | | | |
|---|---|---|---|
| 5,315,709 A | 5/1994 | Alston, Jr. et al. | |
| 2003/0120665 A1 | 6/2003 | Fox et al. | |
| 2004/0083199 A1 | 4/2004 | Govindugari et al. | |
| 2004/0083483 A1 * | 4/2004 | Yamamoto et al. | 719/316 |
| 2005/0229186 A1 * | 10/2005 | Mitchell et al. | 719/315 |
| 2006/0182129 A1 * | 8/2006 | Mutch et al. | 370/401 |

FOREIGN PATENT DOCUMENTS

| | | |
|---|---|---|
| EP | 1388785 A1 | 11/2004 |
| WO | WO2004/010325 | 1/2004 |

OTHER PUBLICATIONS

Czarnecki, K., and Helsen, S., "Classification of Model Transformation Approaches," OOPSLA 03' Workshop on Generative Techniques in the Context of Model-Driven Architecture, Univeristy of Waterloo, Canada, pp. 1-17, (2003).

* cited by examiner

*Primary Examiner*—Andy Ho
(74) *Attorney, Agent, or Firm*—Hamilton, Brook, Smith & Reynolds, P.C.

(57) ABSTRACT

A computer method and system provides on-demand transformation between objects of a source programming model and corresponding objects in a target programming model. For different source objects in the source programming model, the invention creates respective target objects. For every created target object, the invention system and method create a respective proxy object. Where a source object has multiple features, the proxy object triggers transformation of a feature only upon access of that feature and the corresponding target object. The present invention operates transparently to a client. Thus, clients do not have to call transform on the feature (children and references) of the source object before accessing any feature of the target object.

16 Claims, 4 Drawing Sheets

Source Meta-model

Target Meta-model

METHOD AND SYSTEM FOR ON-DEMAND PROGRAMMING MODEL TRANSFORMATION

BACKGROUND OF THE INVENTION

In the software industry, designing of software programs or software products typically begins with a modeling stage. In general, at the modeling level a "problem" is posed in terms of a customer's needs and requirements and may be referred to as the business problem system. The software designer develops a "solution" software product and/or service that addresses the problem. A modeling language, such as UML, has a syntax that enables software designers to express (specify and document) the subject problems and solutions in a standardized manner. The modeling language semantics enable knowledge about the subject system to be captured and leveraged during the problem solving phase. As such, the modeling language enables the sharing of information (including prior solution portions) and extension (without re-implementation) of core object oriented concepts (analysis and design) during the iterative problem-solving process for designing software products.

Model to Model Transformations transform models (Source model) based on any meta-model (source meta-model) to models (target model) based on any meta-model (target meta-model), provided some mapping exists from source meta-model to target meta-model. Further, an element in the source model is referred to as a source element and an element in the target model is referred to as a target element.

Existing technologies doing such transformations on any element in the source model, have to transform all the children of the source element and also references to any other element in the source model. This process is recursive where in any element transformed in the source model results in transformation of its children and references.

If required, to keep this transformed model coherent with the source model, the existing transformation solutions listen to changes to elements in the source model and do the necessary transformations in the target model. Since transformation of every source element results in transformation of other elements in the source model, the Listener routine (procedure) has to listen to all these source elements that are transformed.

The existing transformation solutions are highly inefficient as they sometimes do unnecessary transformations. Live Transformed models are slow because the Listener routine has to handle too many events resulting from unnecessary transformations.

To overcome some of these issues, some transformation solutions allow clients of the transformed model to control every transformation, where a client has to call a transform on every contained element of the source element. But then the client has to deal with both source model and target model, even though the client is only interested in the target model.

SUMMARY OF THE INVENTION

The present invention provides on-demand model to model transformations, which overcomes the shortcomings of the transformation solutions of the prior art.

In the present invention, an on-demand Model to Model transformation transforms a source element in a way that only one element is transformed without transforming children and references of the source element. Transformation of children and references is done when requested by a client. But all this is done without losing any transparency of the target model to the client, which means clients don't have to call a transform on the children and references of the source element before accessing any child or reference of the target element.

In a preferred embodiment, a computer method and system provide on-demand transformation between objects of a source programming model and corresponding objects in a target programming model, by
(1) for different source objects in the source programming model, creating respective target objects; and
(2) for every created target object, creating a respective proxy object, where a source object has multiple features, the proxy object triggering transformation of a feature upon access of that feature and the corresponding target object.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Key Features and benefits of the present invention include:
  Transformation of any element in the source model transforms only that one element.
  No transformations of children and references of the source element are done, unless (and until) requested by the client.
  The client does not have to have any knowledge about the existence of a transformed model. Clients can work with a model based on a target meta-model as if it is a normal model.

Figure 1:
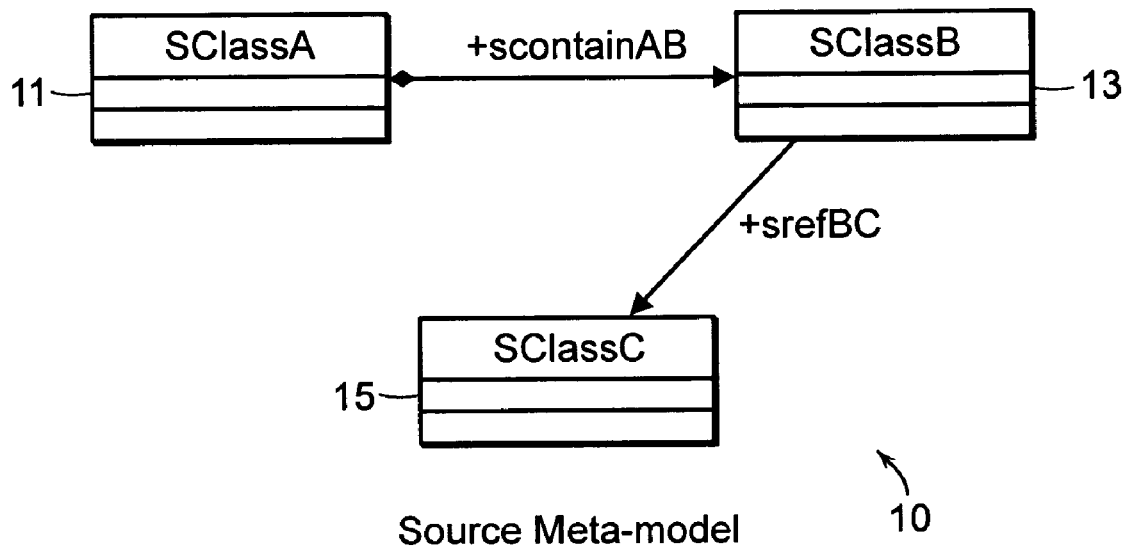
FIG. 1 is a schematic diagram of a source metamodel and target metamodel in the present invention.
Figure 1:
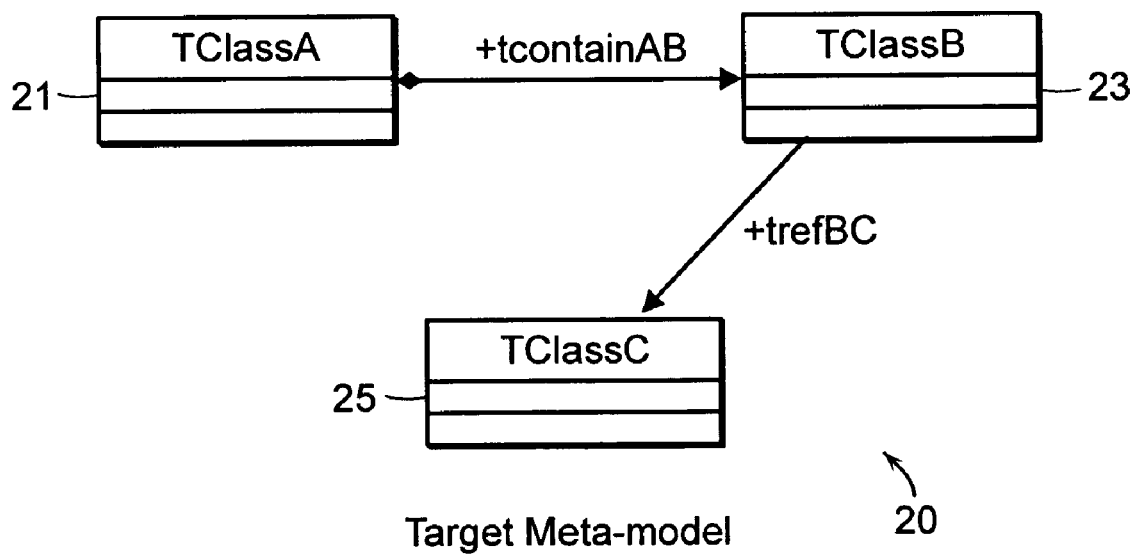

To explain how On-Demand Model to Model transformation of the present invention works, the following discusses two example meta-models (Source 10 and Target 20) illustrated in FIG. 1.

The transformation mappings between source and target meta-model 10, 20 respectively are as follows.
SClassA 11 transforms to TClassA 21.
SClassB 13 transforms to TClassB 23.
SClassC 15 transforms to TClassC 25.

From source meta-model 10, the scontainAB feature transforms to the tcontainAB feature of the target meta-model 20. The source meta-model 10 feature srefBC transforms to trefBC feature of target meta-model 20.

Further, this discussion assumes a model based on source meta-model 10 will be transformed to a model based on target meta-model 20. The assumed source model 10 has three objects sobjA, sobjB, sobjC instantiated from SClassA 11, SClassB 13, SClassC 15, respectively, with the object feature sobjA.scontainAB=sobjb and the object feature sobjB.srefBC=sobjC.

The complete result of the transformation on this model generates a Model based on Target meta-model 20 where there are three objects tobjA, tobjB, tobjC instantiated from TClassA 21, TClassB 23, TClassC 25, respectively, with object feature tobjA.tcontainAB=tobjB and object feature tobjB.trefBC=tobjC.

For the example, assume a client 50 (FIGS. 4 and 5) is programming against the target model 20 and the client code looks like this.

```
browseTClassA(TClassA tobjA) {
...
//do something with tobjA properties.
...
//Get the Contained tobjB.
TClassB tobjB = tobjA.getContainAB( );
}
```

As evident from the client code, client 50 is not interested in transformation of the srefBC feature to generate trefBC. Existing (prior art) transformation solutions do not have the capability to do this kind of selective transformation, and the existing solutions end up transforming all the contained and referenced features of the source element.

Figure 2:
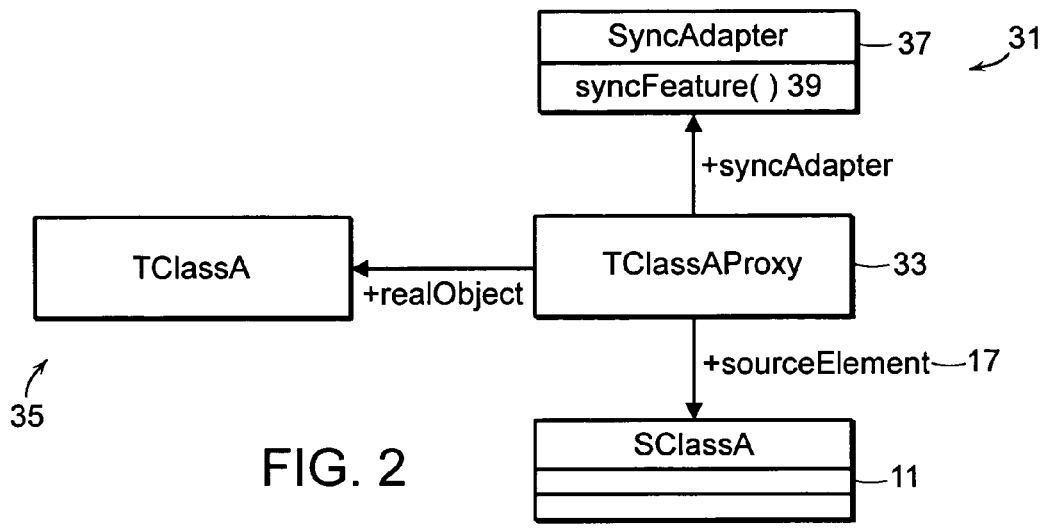
FIG. 2 is a schematic view of a transformation adaptor and proxy objects of the preferred embodiment.

In contrast, the present invention enables and provides such selective transformation as follows. The present invention creates Proxy objects 33 for every Target Object 35 created by a transformation adapter 31 as shown in FIG. 2. Also the transformation adapter 31 initializes the proxy 33 with the source element 17 and a Sync Adapter 37. This proxy object 33 triggers feature transformation whenever client 50 accesses that feature. But the client 50 won't know anything about the transformation going on behind the scene, as it 50 is dealing with an interface to a Target Element (of Target Object 35).

More specifically, client 50 works with the proxy object 33 instead of corresponding target object 35. The proxy object 33 implements the same interface as the target object 35. The SyncAdapter 37 synchronizes features of the target element given a source element 17 and the feature ID to be synchronized. For every feature getter on the target object (Instanceof TClassAProxy) 35, TClassAProxy 33 calls SyncAdapter 37 to synchronize (populate) the contents of the feature.

Alternatively, the present invention may be implemented using an alternate pattern where instead of a proxy 33, the existing implementation of TClassA 21 is sub-classed. Then for every feature getter, the syncFeature function 39 of SyncAdapter 37 is called.

Figure 3:
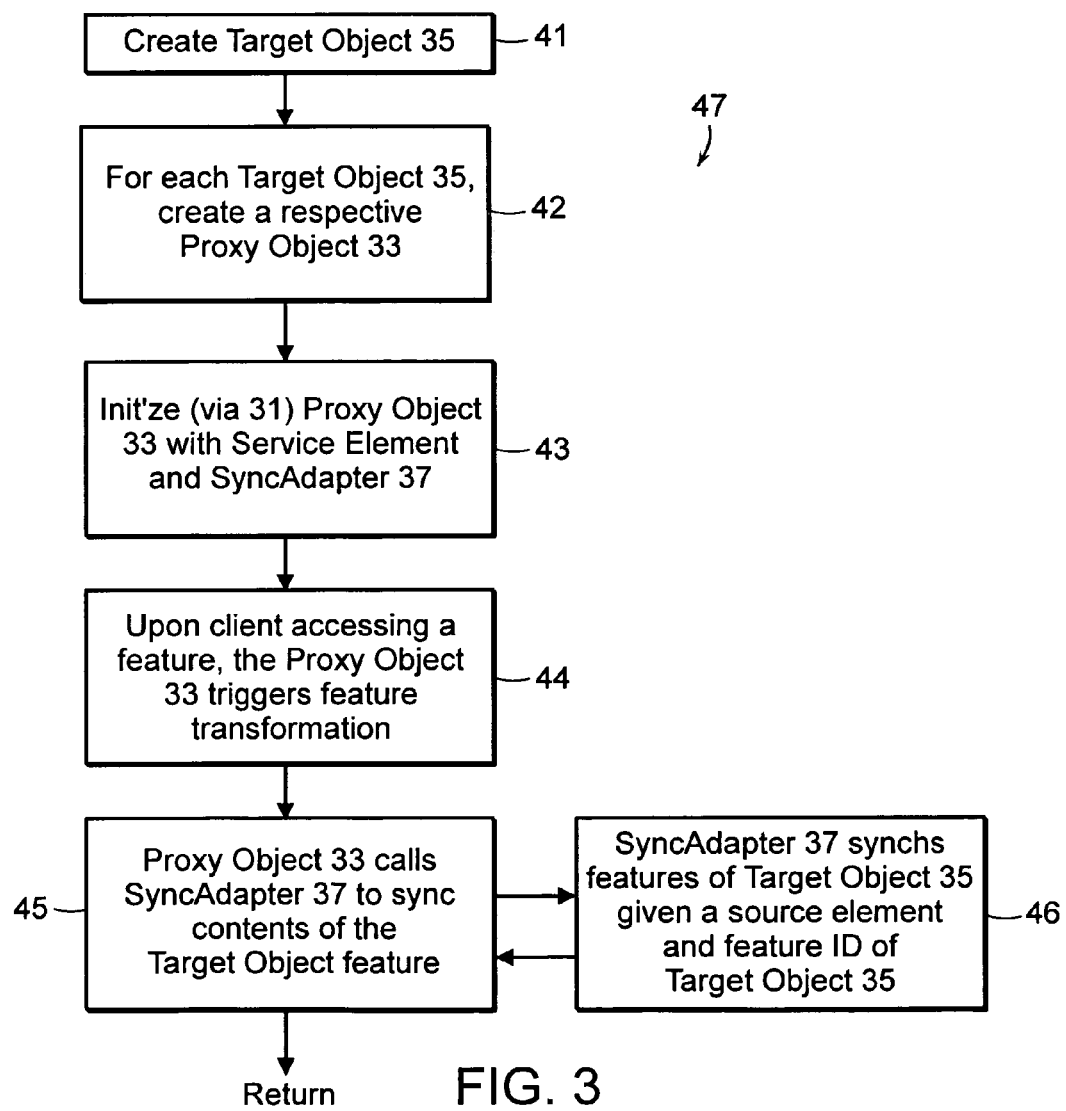
FIG. 3 is a flow diagram of the invention selective transformation method in the embodiment of FIG. 2.

Turning now to FIG. 3 is a flow diagram of the invention method 47 for selective transformation of features of a source element. The method 47 begins with step 41 in which transformation adapter 31 creates a respective Target Object 35 for each desired source object in a source metamodel 10. At this stage, transformation adapter 31 and invention method 47 do not transform any feature of a given source object. For each created Target Object 35, step 42 creates a respective proxy object 33. In response (step 43), transformation adapter 31 initializes proxy objects 33 with respective source elements (source objects) and a SyncAdapter 37. The client 50 then works with proxy objects 33 through an interface that is the same as that of target object 35. Upon a client 50 attempting to access a feature of a Target Object 35, the proxy object 33 triggers feature transformation (step 44). Next (step 45), proxy object 33 calls SyncAdapter 37 to synchronize contents of the Target Object feature. In turn (step 46), SyncAdapter 37 synchronizes features of Target Object 35 based on respective source object and a feature ID (i.e., identifier of subject feature of Target Object 35). In the preferred embodiment, SyncAdapter 37 accomplishes this by its syncFeature function 39 (FIG. 2).

Figure 4:
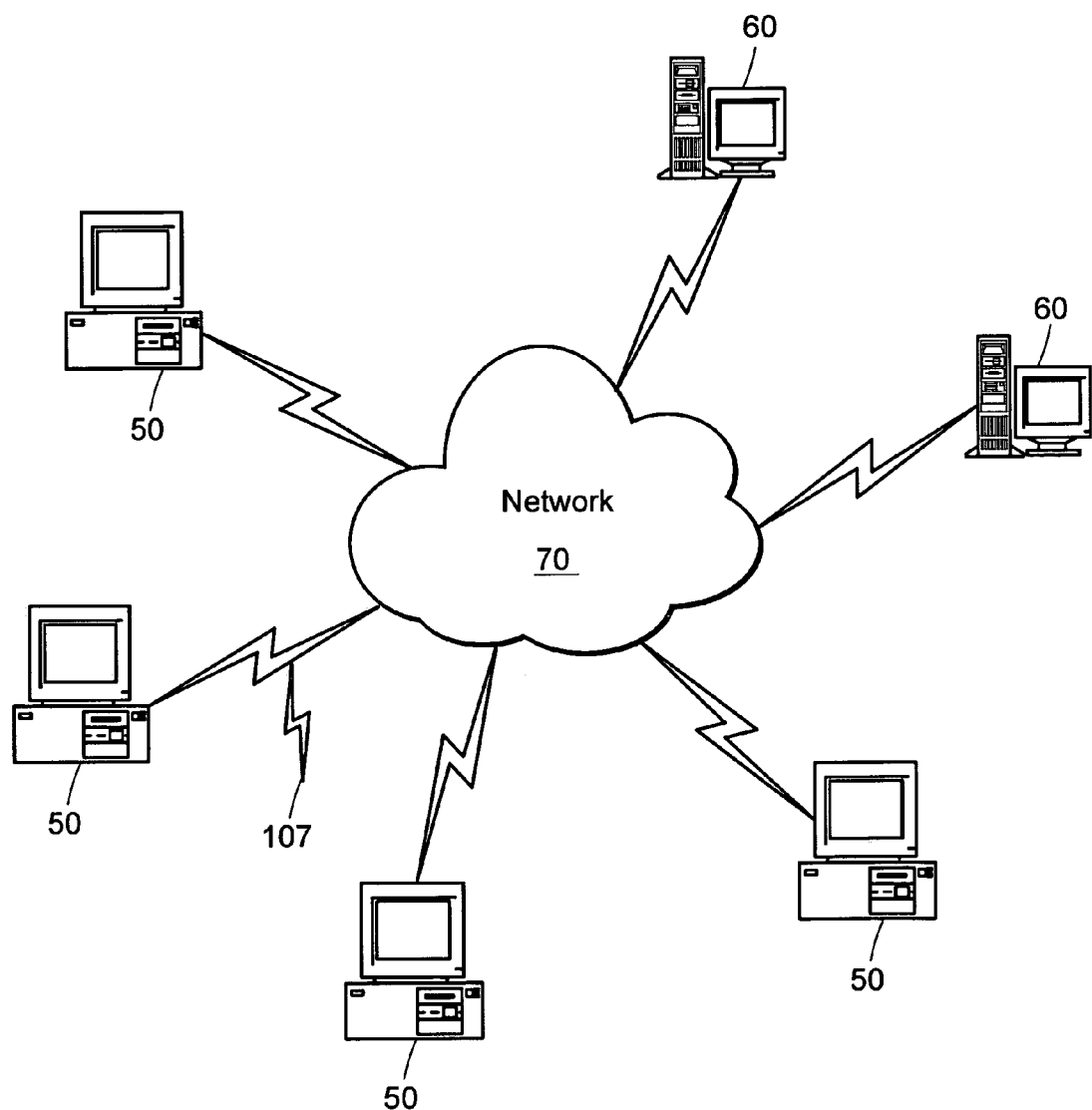
FIG. 4 is a block diagram of a computer network environment in which embodiments of the present invention are implemented.

FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
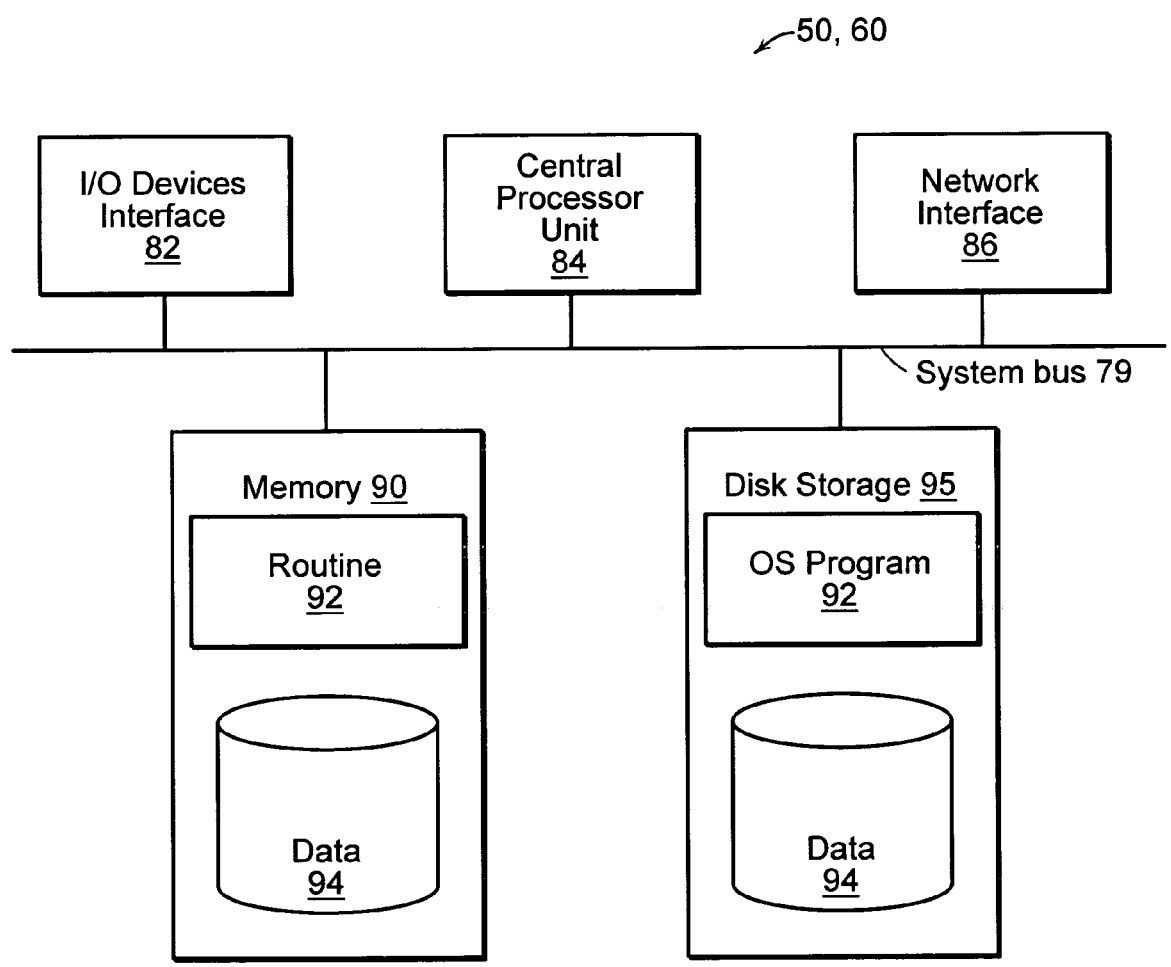
FIG. 5 is a block diagram of one of the computers of the network of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., source and target models 10, 20, selective transformation process/method 47 and transformation adapter 31). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagation medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 4 and 5 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Possible applications of the present invention technology are (i) On-Demand Reverse Engineering of language models to UML, (ii) UML Visualization and the like.

What is claimed is:

1. A computer method for providing on-demand transformation between objects of a source programming model and corresponding objects in a target programming model, comprising the steps of:
   for different source objects in the source programming model, creating respective target objects; and
   for every created target object, creating a respective proxy object, where a source object has multiple features, the proxy object triggering transformation of a feature upon access of that feature and the corresponding target object, instead of upon creation of the target objects.

2. A method as claimed in claim 1 further comprising the step of:
   for each time of accessing a feature on a target object, synchronizing contents of the feature with a corresponding feature on the respective source object.

3. A method as claimed in claim 1 further comprising the step of synchronizing features of a target object based on the respective source object.

4. A method as claimed in claim 1 wherein the step of creating a respective proxy object for each target object is replaced with the step of subclassing the target object; and
   for each accessing of a feature on a target object, synchronizing contents of the feature with a corresponding feature on the respective source object.

5. Computer apparatus for providing on-demand transformation between objects of a source programming model and corresponding objects in a target programming model, comprising:
   a digital processor enabling a respective target object for each different source object in the source programming model; and
   for each target object, a respective proxy object executable by the digital processor, where a source object has multiple features, the proxy object triggering transformation of a feature upon access of that feature and the corresponding target object.

6. Computer apparatus as claimed in claim 5 wherein for each time of accessing a feature on a target object, the respective proxy object synchronizes contents of the feature with a corresponding feature on the respective source object.

7. Computer apparatus as claimed in claim 5 further comprising a transformation adapter creating the target objects and initializing the proxy objects with respective source objects.

8. Computer apparatus as claimed in claim 7 wherein the transformation adapter has a synchronization adapter for synchronizing features of a target object based on the respective source object.

9. A computer system for providing on-demand transformation between objects of a source programming model and corresponding objects in a target programming model, comprising:
   transformation adapting means in a digital processor for creating a respective target object for each different source object in the source programming model; and processor means for triggering transformation of a feature of a source object only upon access of that feature and a corresponding target object, wherein the triggering being performed by a proxy object.

10. A computer system as claimed in claim 9 wherein the means for triggering includes a subclass of the target object.

11. A computer system as claimed in claim 9 wherein the means for triggering includes a respective proxy object for each target object.

12. A computer system as claimed in claim 11 wherein for each time of accessing a feature on a target object, the respective proxy object synchronizes contents of the feature with a corresponding feature on the respective source object.

13. A computer system as claimed in claim 9 further comprising means for synchronizing features of a target object based on the respective source object.

14. A computer program product having a computer readable storage medium carrying instructions for controlling a digital processor to provide on-demand transformation between objects of a source programming model and corresponding objects in a target programming model, by carrying out the steps of:
   for different source objects in the source programming model, creating respective target objects; and
   for every created target object, creating a respective proxy object, where a source object has multiple features, the proxy object triggering transformation of a feature upon access of that feature and the corresponding target object instead of upon creation of the target objects.

15. A computer program product as claimed in claim 14 further comprising the step of synchronizing features of a target object based on the respective source object.

16. A computer program product as claimed in claim 14 wherein the step of creating a respective proxy object for each target object is replaced with the step of subclassing the target object; and
   for each accessing of a feature on a target object, synchronizing contents of the feature with a corresponding feature on the respective source object.

* * * * *